United States Patent
Takano

[19]
[11] Patent Number: 5,973,287
[45] Date of Patent: *Oct. 26, 1999

[54] RESISTANCE WELDING METHOD AND APPARATUS USED IN THE METHOD

[75] Inventor: Yukinori Takano, Shizuoka, Japan

[73] Assignee: Yazaki Corporation, Tokyo, Japan

[ * ] Notice: This patent is subject to a terminal disclaimer.

[21] Appl. No.: 09/095,880

[22] Filed: Jun. 11, 1998

[30] Foreign Application Priority Data

Dec. 6, 1997 [JP] Japan .................................... 9-155255

[51] Int. Cl.$^6$ .................................................. B23K 11/24
[52] U.S. Cl. ............................... 219/56; 219/58; 219/91.1
[58] Field of Search ......................... 219/56, 56.1, 56.21, 219/56.22, 58, 78.16, 91.1, 91.2, 91.23, 108, 109, 110, 117.1

[56] References Cited

U.S. PATENT DOCUMENTS

| | | | |
|---|---|---|---|
| 3,352,994 | 11/1967 | Merchant | 219/91.2 X |
| 3,876,854 | 4/1975 | Andrew et al. | 219/91.1 |
| 4,922,072 | 5/1990 | Topel et al. | 219/56.1 |
| 5,645,738 | 7/1997 | Cecil | 219/59.1 X |
| 5,808,260 | 9/1998 | Asakura et al. | 219/56.22 |

FOREIGN PATENT DOCUMENTS

| | | | |
|---|---|---|---|
| 56-56781 | 5/1981 | Japan | 219/91.1 |
| 62-155977 | 10/1987 | Japan . | |
| 4-22584 | 1/1992 | Japan . | |
| 5-169272 | 9/1993 | Japan . | |
| 5-329661 | 12/1993 | Japan . | |

*Primary Examiner*—Gregory Mills
*Attorney, Agent, or Firm*—Morgan, Lewis & Bockius LLP

[57] ABSTRACT

A resistance welding apparatus in which welding portions of materials to be welded are resistance-welded with each other by use of resistance heating caused by conduction of a welding current while the welding portions are pressed between a pair of electrodes, characterized in that the apparatus comprises: a welding transformer for supplying the welding current; a welding timer for controlling the current-conduction time of the welding current; a width measurement unit for measuring the welding width of the welding portions; an arithmetic operation unit for reversely calculating the reference welding height of the welding portions from the welding width measured by the width measurement unit on the basis of a predetermined reference welding sectional area of the welding portions; a height detection unit for detecting whether the height of the welding portion has reached the reference welding height or not; and an interface for controlling the welding timer to stop conduction of the welding current when the reference welding height of the welding portion is detected by the height detection unit.

4 Claims, 6 Drawing Sheets

RESISTANCE WELDING METHOD AND APPARATUS USED IN THE METHOD

BACKGROUND OF THE INVENTION

The present invention relates to a resistance welding method (a lap resistance welding method such as a spot welding method) in which, for example, a strand composed of twisted wires of one electric cable and a strand composed of twisted wires of the other electric cable are put on one another and pressed between a pair of electrodes, and a large current is passed through the strands for a short time to utilize resistance heating caused by the current conduction to thereby perform resistance welding, and an apparatus for use in such a method.

As such a type of resistance apparatus, there is an apparatus of an AC thyristor system (a system in which thyristors are used as electric source switches for performing welding current regulation continuously by changing the firing phase of the thyristors) shown in FIG. 6($a$). The resistance welding apparatus 1, which performs resistance welding on strands 31 and 31' put one on the other, as materials to be welded, of a pair of electrically insulating coated electric cables 30 and 30' (hereinafter simply referred to as "cables"), has a box-like apparatus body 2 which is substantially U-shaped in side view. A cable-setting jig 3 is disposed in the center of the apparatus body 2. An air cylinder 4 is attached to the upper front of the apparatus body 2. A pair of upper and lower electrodes 5A and 5B, which serve to pass a welding current through a welding portion of the strands 31 and 31' and also serve to apply a predetermined amount of pressure to the welding portion, are provided below the air cylinder 4, and the cable-setting jig 3 respectively.

The upper electrode 5A is connected to a piston rod 4$a$ of the air cylinder 4 through an electrode holder 6 so as to move vertically. Further, the upper electrode 5A is also connected, through an ounce copper plate 8, to a welding transformer (electric source) 7 which serves to supply a welding current. Further, the lower electrode 5B is fixed to the center portion of the apparatus body 2 and connected to the welding transformer 7. The welding transformer 7 is connected to a welding timer 9 which serves to set the current value and current-conduction time of the welding current. An electromagnetic valve 4A of the air cylinder 4 is opened/closed on the basis of conduction-start and conduction-end signals obtained from the welding timer 9. Incidentally, each of the electrodes 5A and 5B is constituted by a columnar chromium-copper matter 5$a$ and a rectangular tungsten tip 5$b$.

The step of performing resistance welding of the strands 31 and 31' of the pair of cables 30 and 30', which are put on one another by means of the AC thyristor system resistance welding apparatus 1 as shown in FIG. 7 will be described with reference to a flow chart shown in FIG. 8. First, after the exposed strands 31 and 31' of the pair of cables 30 and 30' are put in between the pair of electrodes 5A and 5B through the cable-setting jig 3, a start input switch 9A is turned on so that the welding timer 9 starts (step S1). As a result, the electromagnetic valve 4A connected to a not-shown compression air source is opened and the upper electrode 5A is moved down by the air cylinder 4. After completion of initial pressure application to the strands 31 and 31' between the pair of electrodes 5A and 5B (step S2), a welding current is passed between the pair of electrodes 5A and 5B alternately upward and downward by the welding transformer 7 (step S3). The welding current is passed for the current-conduction time which is set (fixed) in advance. Resistance heating caused by the conduction of the welding current is utilized so that the strands 31 and 31' are fused. After resistance welding, the current conduction is stopped (step S4). Then, cooling is performed while the pressure application state between the pair of electrodes 5A and 5B is held for a predetermined time (step S5). The operation for the steps S2 to S5 is carried out automatically under the sequence control of the welding timer 9. Then, when the pressurized state is canceled, the resistance welding is completed (step S6). Incidentally, a similar technique is disclosed in Japanese Patent Unexamined Publication No. Hei. 4-22584.

In the conventional resistance welding apparatus 1, however, the current-conduction time of the welding current was fixed to a predetermined value under the constant-current control by means of a combination of the welding transformer 7 and the welding timer 9. Accordingly, when the secondary resistance value of the pair of electrodes 5A and 5B changed, the amount of heating also changed. Accordingly, the welding state (welding quality) such as welding strength (adhesive force), or the like, of the strands 31 and 31' composed of twisted wires varied easily. That is, when the heating value is Q, the heating value Q is expressed by $Q=I^2 \cdot R \cdot T$ in which the current I is constant and the time T is constant. The resistance R varies because of variations due to oxidation resistance of the strands 31 and 31' each of which is constituted by a plurality of twisted wires, the change in resistance due to the change in shape of the electrodes 5A and 5B made from tungsten, or the like, variations in the state of oxide film on the bonded surface of the tungsten tip 5$b$ in each of the electrodes 5A and 5B, variations in pressure applied between the electrodes 5A and 5B, etc. Accordingly, it was difficult to make welding quality stable.

SUMMARY OF THE INVENTION

Therefore, the present invention is designed to solve the above problems and it is an object of the present invention to provide a resistance welding method in which welding quality can be always kept high, and an apparatus for use in such a method.

According to a first aspect of the invention, provided is a resistance welding method in which a welding current is passed through a welding portion of a material to be welded in a condition that pressure is applied to the welding portion between a pair of electrodes, so that resistance heating caused by conduction of the welding current is utilized to perform thermo-compression bonding of the welding portion to thereby perform resistance welding of the welding portion under pressure applied between the pair of electrodes, characterized by comprising the steps of: measuring a welding width of the welding portion; calculating a reference welding height of the welding portion from the measured welding width on the basis of a predetermined reference welding sectional area of the welding portion; and passing the welding current through the welding portion until the height of the welding portion reaches the calculated reference welding height.

In this resistance welding method, the current-conduction time of the welding current is adjusted in accordance with variations in resistance value of the secondary side of the electrodes so that the conduction of the welding current is stopped at a point of time when the gap in the welding portion of the materials to be welded is eliminated. Accordingly, welding quality is made stable because it is not affected by the change of the resistance value in the secondary side of the electrodes.

According to a second aspect of the invention, the above method of the first aspect is characterized in that respective strands of a pair of electric cables are used as the materials to be welded so that an exposed strand of one of the electric cables is resistance-welded to an exposed strand of the other one of the electric cables.

In this resistance welding method, the gap between the wires of the strands is eliminated, so that the peripheries of the wires of the strands are closely resistance-welded with each other. Accordingly, the adhesive force (welding strength) between the wires of the strands is made stable regardless of the state of the alignment of the strands.

According to a third aspect of the invention, provided is a resistance welding apparatus comprising a pair of electrodes for passing a welding current through a welding portion of a material to be welded and for applying a predetermined amount of pressure to the welding portion, a welding timer for controlling current-conduction time of the welding current, and a welding transformer for supplying the welding current, whereby resistance heating caused by the conduction of the welding current is utilized to perform resistance welding on the welding portion of the material to be welded in a condition that pressure is applied onto the welding portion by the pair of electrodes, characterized in that the apparatus further comprises: a width measurement means for measuring a welding width of the welding portion; an arithmetic operation means for reversely calculating a reference welding height of the welding portion from the welding width measured by the width measurement means on the basis of a predetermined reference welding sectional area of the welding portion; a height detection means for making detection as to whether a height of the welding portion has reached the reference welding height or not; and an interface for controlling the welding timer to stop the conduction of the welding current when the reference welding height of the welding portion is detected by the height detection means.

In this resistance welding apparatus, the current-conduction time of the welding current can be changed by the welding timer correspondingly to the materials to be welded (subjects of welding). Accordingly, the heating value can be changed in accordance with variations in the resistance value in the secondary side of the electrodes. Accordingly, variation in welding quality can be eliminated to thereby improve the welding quality. Furthermore, because there is no need of expendable materials such as a welding rod, etc., the cost is low and the production efficiency is good.

According to a fourth aspect of the invention, the above apparatus of the third aspect is characterized in that respective strands of a pair of electric cables are used as the materials to be welded so that an exposed strand of one of the electric cables is resistance-welded to an exposed strand of the other one of the electric cables.

In this resistance welding apparatus, the gap between wires of the strands is eliminated so that the wires of the strands are closely welded with each other. Accordingly, the welding strength is made stable regardless of the state of the alignment of the strands so that the welding quality is improved.

DETAILED DESCRIPTION OF THE INVENTION

A preferred embodiment of the present invention will be described below with reference to the drawings.

Figure 1:
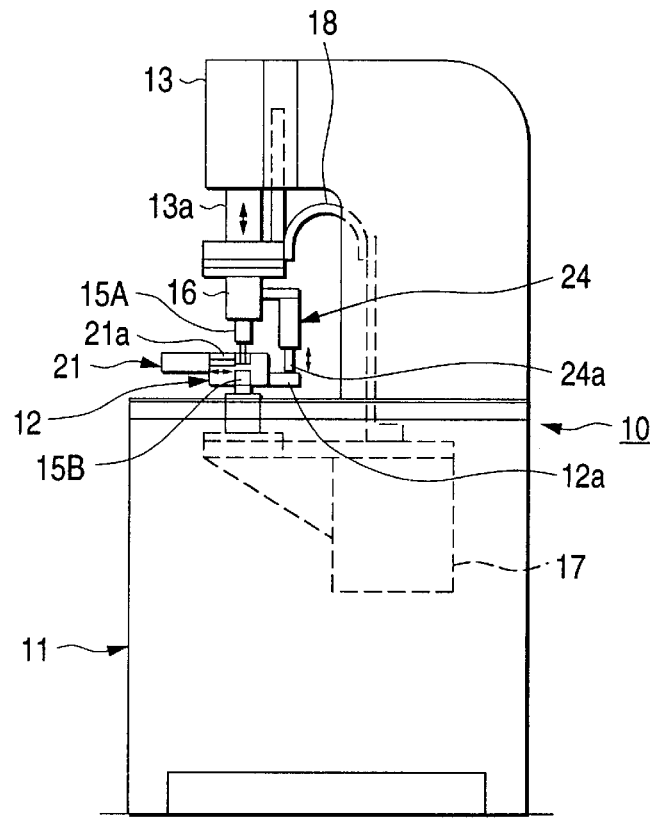
FIG. 1(a) is a side view showing a resistance welding apparatus in an embodiment of the present invention.
FIG. 1(b) is a configuration view of a main part of the resistance welding apparatus.
Figure 1:
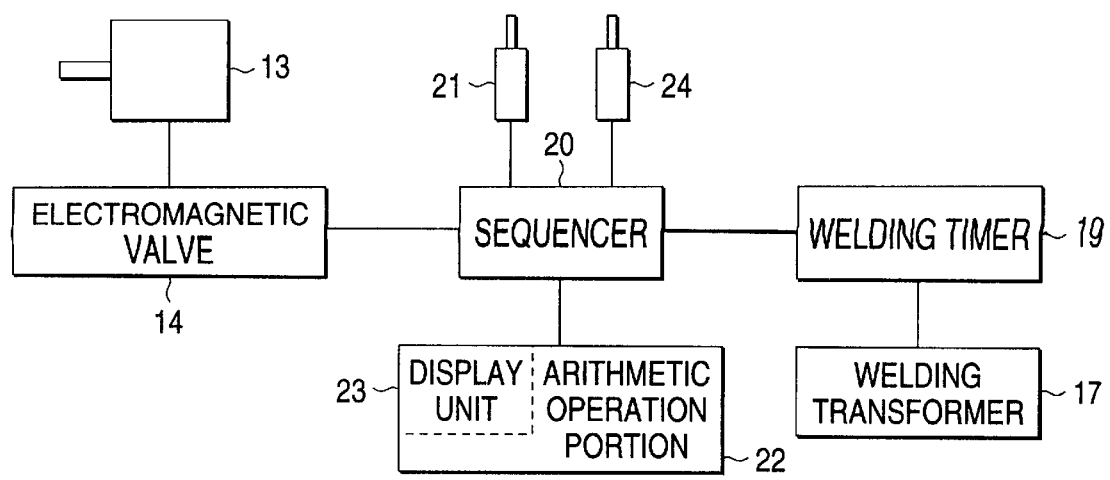
Figure 2:
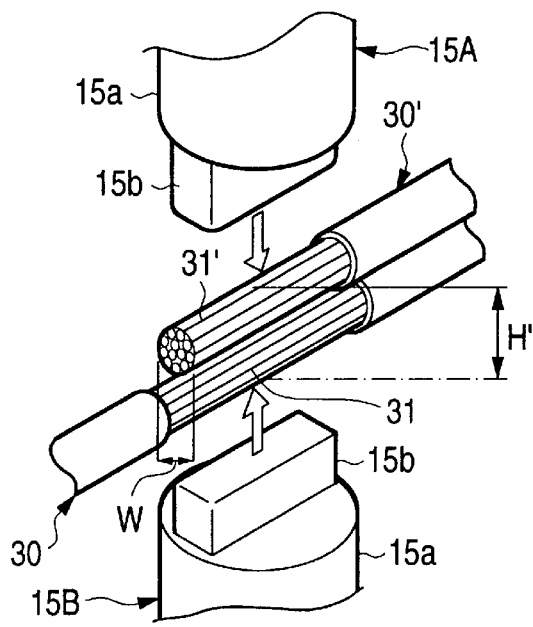
FIG. 2(a) is a perspective view showing the strands of a pair of cables to be resistance-welded by the resistance welding apparatus.
FIG. 2(b) is an explanatory view showing the relation in lamination between a pair of electrodes and the strands of a pair of cables at the time of resistance welding.
Figure 2:
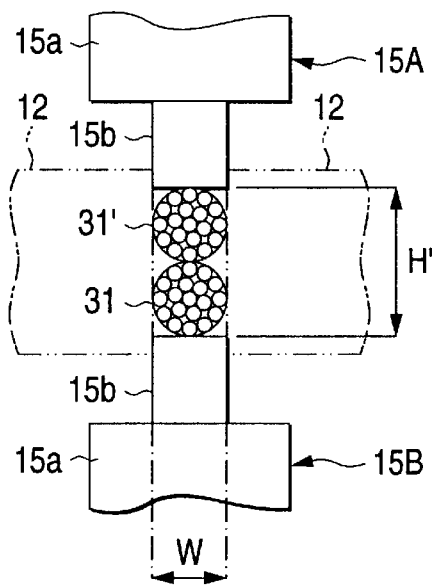

FIG. 1(a) is a side view showing a resistance welding apparatus in an embodiment of the present invention; FIG. 1(b) is a configuration view of a main part of the resistance welding apparatus; FIG. 2(a) is a perspective view showing a pair of cables which are subjected to resistance welding by the resistance welding apparatus; and FIG. 2(b) is an explanatory view showing the relation of stack between the pair of electrodes and the pair of cables at the time of the resistance welding.

The resistance welding apparatus 10 shown in FIG. 1(a) is an apparatus of an AC thyristor system (a system in which thyristors are used as electric source switches for performing welding current regulation continuously by changing the firing phase of the thyristors). The resistance welding apparatus 10 serves to perform resistance welding on strands 31 and 31' of a pair of cables 30 and 30' which are put on one another as materials to be welded. The resistance welding apparatus 10 has a box-like apparatus body 11 which is substantially U-shaped in side view. A cable-setting jig 12 is disposed in the center of the apparatus body 11. An air cylinder (drive means) 13 is attached to the upper front of the apparatus body 11. A pair of upper and lower electrodes 15A and 15B, which serve to pass a welding current through a welding portion of the strands 31 and 31' and also serve to apply a predetermined amount of pressure to the welding portion, are provided below the cable-setting jig 12 and below the air cylinder 13. Each of the electrodes (electrode tips) 15A and 15B is constituted by a columnar chromium-copper body 15a and a rectangular tungsten tip 15b.

The upper electrode 15A is connected to a piston rod 13a of the air cylinder 13 through an electrode holder 16 so as to move vertically. Further, the upper electrode 15A is also connected, through an ounce copper plate 18, to a welding transformer (electric source) 17 which serves to supply a welding current. On the other hand, the lower electrode 15B is fixed to the center portion of the apparatus body 11 and connected to the welding transformer 17. Further, a welding timer 19 which controls the current-conduction time of the welding current is connected to the welding transformer 17. A sequencer (interface) 20 having a sequence control circuit not shown, or the like, is connected to the welding timer 19. Not only an electromagnetic valve 14 of the air cylinder 13 is opened/closed but also the welding timer 19 is controlled (to start/end the current conduction) on the basis of conduction-start and conduction-end signals obtained from the sequencer 20. Incidentally, the pressure applied between the pair of electrodes 15A and 15B by the piston rod 13a of the air cylinder 13 is set to be, for example, in a range of from about 100 to about 200 kgf. Further, in order to obtain a low voltage (for example, about 2 V) and a large current (for example, in a range of from 4000 to 6000 A), the welding transformer 17 has a primary winding, a secondary winding, or the like, which are not shown.

Figure 3:
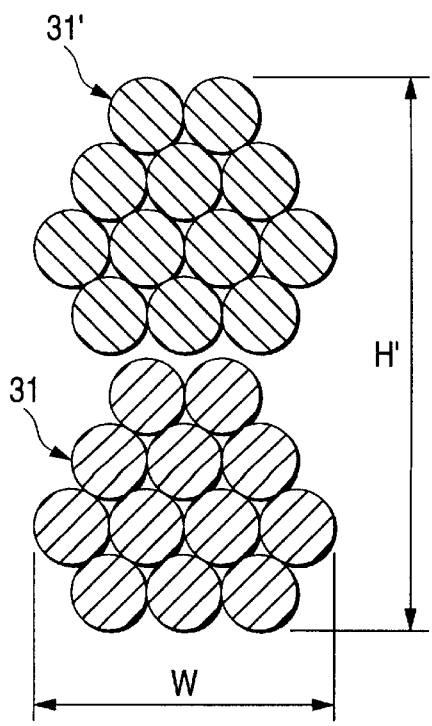
FIG. 3(a) is an explanatory view showing a state in which strands of the pair of cables have not been welded yet.
FIG. 3(b) is an explanatory view showing a reference welding sectional area indicating a state in which the strands are welded.
Figure 3:
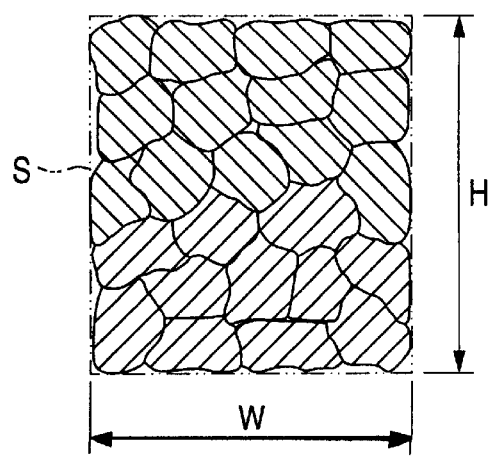

As shown in FIG. 1(a), a width displacement sensor (width measurement means) 21 for measuring the welding width W of the welding portion of the strands 31 and 31' is provided in the cable-setting jig 12. As shown in FIGS. 3(a) and 3(b), an arithmetic operation portion (arithmetic operation means) 22 having an arithmetic operation means not shown, or the like, is connected to the sequencer 20 for reversely calculating (S W=H) to obtain the reference welding height H of the welding portion from a predetermined reference welding sectional area S of the welding portion on the basis of the welding width W of the welding portion of the strands 31 and 31' measured by the width displacement sensor 21. Further, a display unit (display means) 23 is provided in the arithmetic operation portion 22 for displaying the current-conduction time from start to end of the conduction of the welding current, or the like. Furthermore, a height displacement sensor (height detection means) 24 is provided in the electrode holder 16 for making detection as to whether the height H' of the welding portion has reached the reference welding height H or not so that the welding timer 19 is controlled by the sequencer 20 to stop the conduction of the welding current when the reference welding height H of the welding portion is detected by the height displacement sensor 24.

The width displacement sensor 21 has a probe 21a which moves horizontally so that the welding width W of the welding portion of the strands 31 and 31' is measured on the basis of the moving distance of the probe 21a. Further, the display unit 23 has a liquid crystal panel not shown, or the like, so that information of the current-conduction time from the start to end of conduction of the welding current, or the like, is displayed on the liquid crystal panel. Further, the height displacement sensor 24 has a probe 24a which moves vertically and which comes into contact with a reference plate portion 12a of the cable-setting jig 12 so that whether the height H' of the welding portion of the strands 31 and 31' has reached the reference welding height H or not is detected on the basis of the moving distance of the probe 24a.

Figure 4:
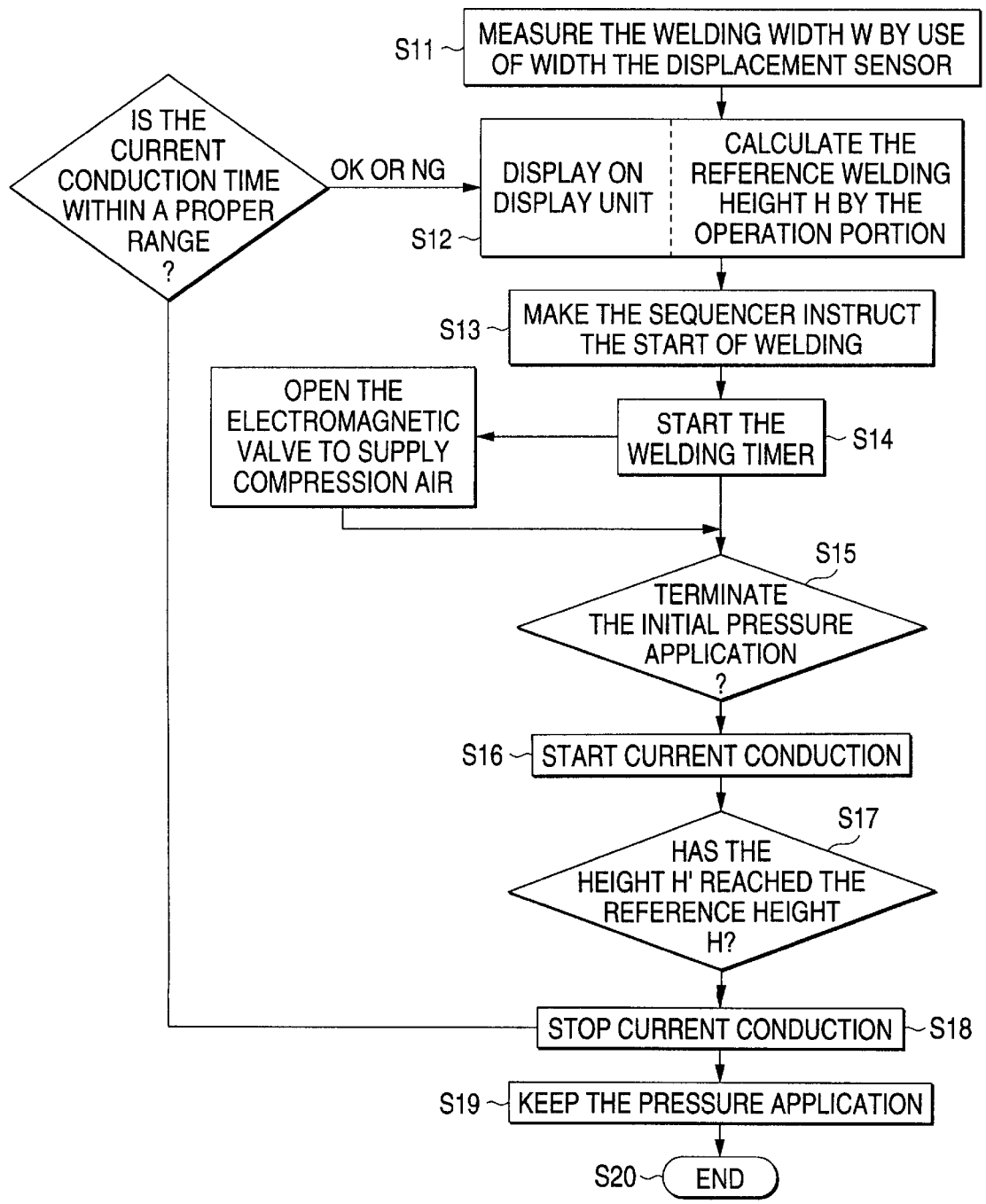
FIG. 4 is a flow chart for sequentially explaining the resistance welding of the strands of the pair of cables by the resistance welding apparatus.

The step of performing resistance welding on the strands 31 and 31' composed of twisted wires of the pair of cables 30 and 30' which are put on one another, by use of the AC thyristor system resistance welding apparatus 10 in the aforementioned mode will be described below with reference to a flow chart shown in FIG. 4. First, as shown in FIG. 2(b), after the exposed strands 31 and 31' of the pair of cables 30 and 30' are set in the cable-setting jig 12 so as to be put on one another, the welding width W of the welding portion of the strands 31 and 31' is measured (step S11). When the reference welding height H of the welding portion is calculated by the arithmetic operation portion 22 on the basis of the reference welding sectional area S of the welding portion of the strands 31 and 31' predetermined by the measured welding width W (step S12), the sequencer 20 issues an instruction to input the welding start (step S13). As a result, the welding timer 19 starts (step S14). At the same time, the electromagnetic valve 14 connected to a compression air source not shown is opened, so that the upper electrode 15A is moved down. After completion of initial pressure application to the strands 31 and 31' between the pair of electrodes 15A and 15B (step S15), a welding current is passed between the pair of electrodes 15A and 15B alternately upward and downward by the welding transformer 17 (step S16). Resistance heating caused by the conduction of the welding current is utilized so that the strands 31 and 31' is subjected to thermo-compression bonding (or diffusion bonding) by using the resistance heating.

Figure 5:
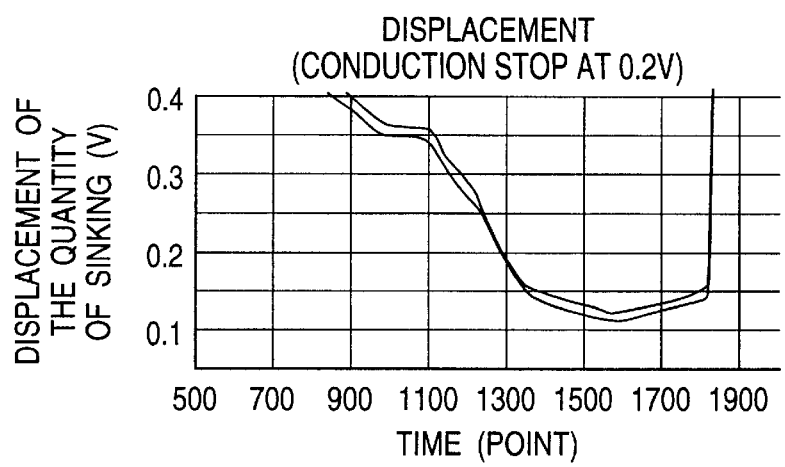
FIG. 5(a) is a characteristic graph showing the relationship between the displacement (voltage waveform V) of the quantity (H'–H) of sinking of the welding portion and time (for example, 2 msec/1 point when the sampling frequency is 500 Hz) in a state in which the wires of the strands are closely welded with each other without any gap, by the aforementioned resistance welding apparatus.
FIG. 5(b) is a characteristic graph showing the relationship between the inter-tip resistance (mΩ) in a pair of electrodes and current-conduction time (cycles) in the same welded state.
FIG. 5(c) is a characteristic graph showing the relationship between the adhesive force (kgf) between the wires of the strands and the displacement (V) of the quantity of sinking of the welding portion in the case where the current-conduction time of the welding current is changed in the same resistance welding apparatus.
FIG. 5(d) is a characteristic graph showing the relationship between the adhesive force (kgf) between the wires of the strands and the displacement (V) of the quantity of sinking of the welding portion in the case where the current-conduction time of the welding current is fixed, in a conventional resistance welding apparatus.
Figure 5:
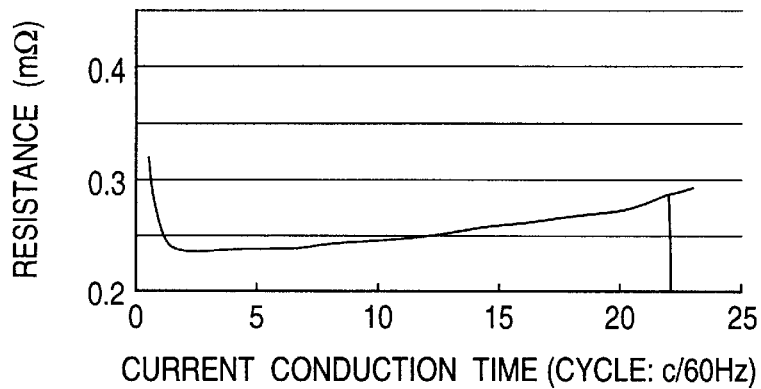
Figure 5:
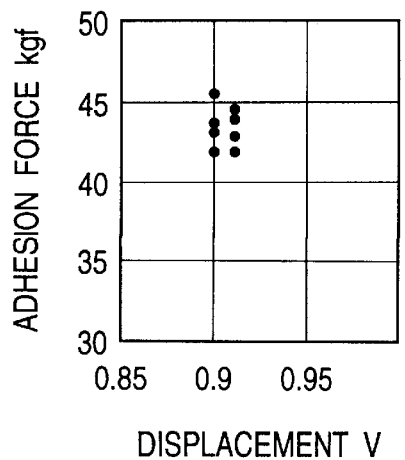
Figure 5:
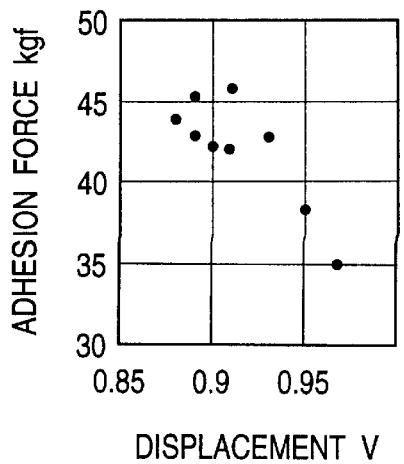
Figure 6:
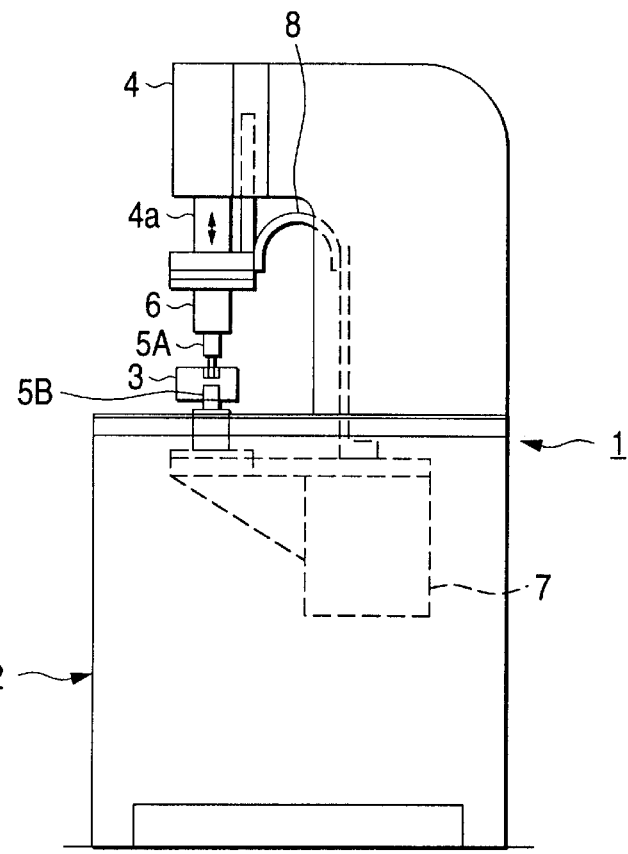
FIG. 6(a) is a side view of a conventional resistance welding apparatus.
FIG. 6(b) is a configuration view of a main part of the resistance welding apparatus.
Figure 6:
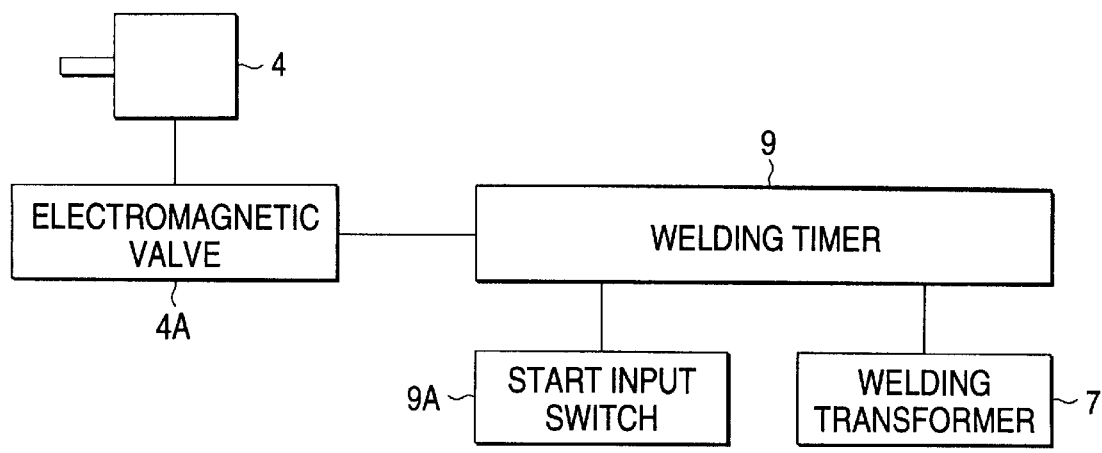
Figure 7:
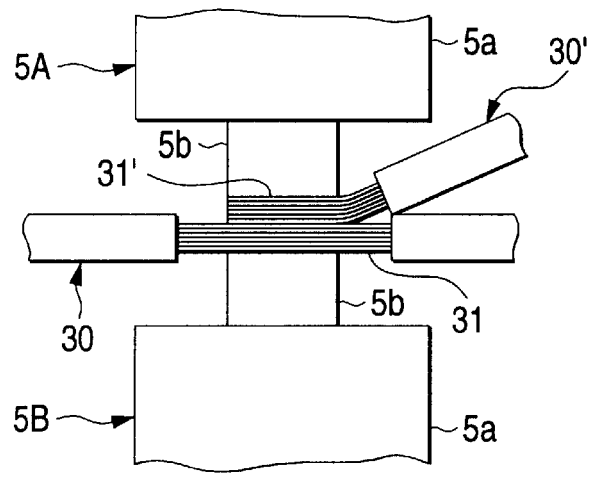
FIG. 7 is an explanatory view in the case where the strands of the pair of cables are welded between the pair of electrodes in the conventional resistance welding apparatus.
Figure 8:
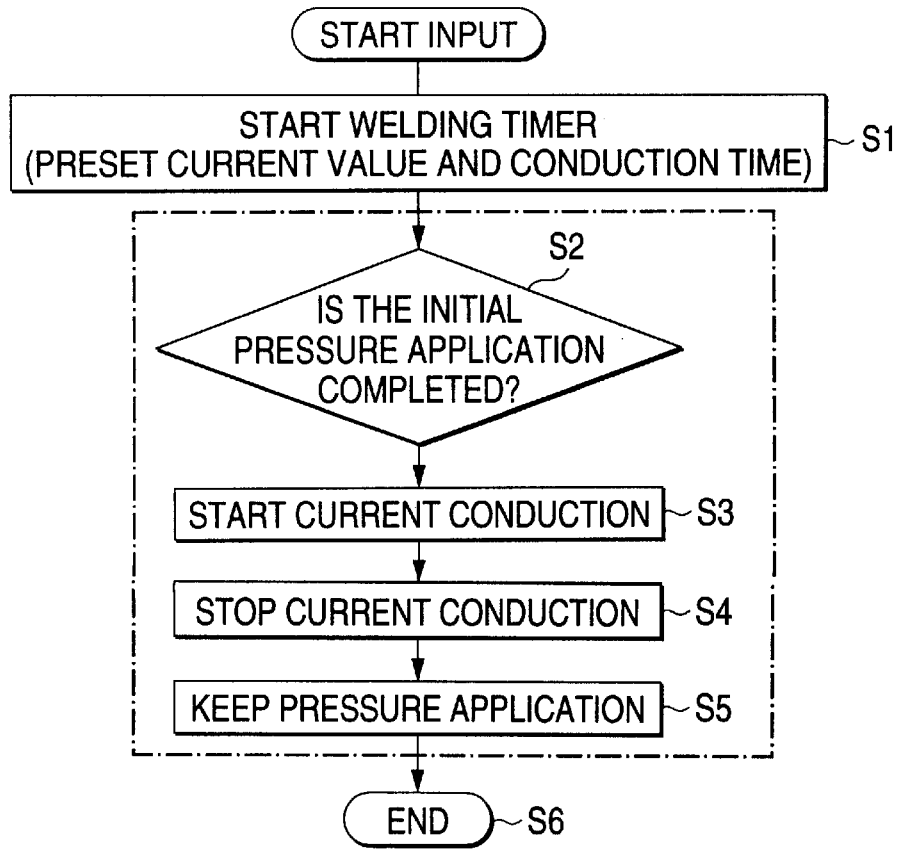
FIG. 8 is a flow chart for sequentially explaining the resistance welding of the strands of the pair of cables in the conventional resistance welding apparatus.

When the height displacement sensor 24 detects the fact that the height H' of the welding portion of the strands 31 and 31' has reached the reference welding height H (H'=H) (step S17), the sequencer 20 stops the conduction of the welding current through the welding timer 19 (step S18). That is, the welding current is passed continuously to perform resistance welding of the strands 31 and 31' until the height displacement sensor 24 detects the fact that the height H' of the welding portion of the strands 31 and 31' has reached the reference welding height H. The current-conduction time from the start to end of conduction of the welding current is displayed on the display unit 23 as shown in FIG. 5(b), and whether the current-conduction time is in a proper range or not is displayed on this display unit 23. Then, cooling is performed while the state of pressure between the pair of electrodes 15A and 15B is held for a predetermined time (step S19). Then, the state of pressure is canceled to terminate the resistance welding (step S20).

FIGS. 5(a), 5(b) and 5(c) show the experimental data, for example, about the case where the conduction of the welding current was performed until the height H' of the welding portion of the strands 31 and 31' reached the reference welding height H, for example, in the condition in which the welding width W of the welding portion of the strands 31 and 31' of the pair of cables 30 and 30' was 2.5 mm, the reference welding sectional area S was 7.5 mm$^2$, the reference welding height H was 3.0 mm, the height H' of the welding portion before welding was 5.0 mm, the pressure applied to the pair of electrodes 15A and 15B was 150 kgf, and the welding current was 4000 A. As a result, the gap between the strands became zero in the welding portion of the strands 31 and 31' subjected to resistance welding as shown in FIG. 3(b), so that the strands 31 and 31' are brought into a state in which the peripheries of the strands are closely connected and welded to each other (the percentage of the gap between the strands 31 and 31' is zero). Accordingly, the welding strength (the adhesive force between the wires) is stabilized as shown in FIG. 5(c) regardless of the alignment of the strands 31 and 31'. This is clear if FIG. 5(c) is compared with FIG. 5(d) which shows experimental data in the conventional case where the current-conduction time from the start to end of conduction of the welding current is fixed to a predetermined time under constant-current control.

As described above, the welding width W of the welding portion of the strands 31 and 31' is measured by the width displacement sensor 21. The reference welding height H of the welding portion is calculated from the measured welding width W on the basis of a predetermined reference welding sectional area S of the welding portion. The conduction of the welding current is continued to perform resistance welding in the welding portion of the strands 31 and 31' until the height H' of the welding portion reaches the calculated reference welding height H (until the gap between the wires of the strands 31 and 31' becomes zero). That is, the current-conduction time of the welding current can be changed under constant-current control in accordance with the subjects of welding in the strands 31 and 31'. Accordingly, the heating value can be changed in accordance with variations in the resistance value in the secondary side of the pair of electrodes 15A and 15B (variations due to oxidation resistance in the welding portion of the strands 31 and 31', the change in resistance due to the change in shape of the electrodes 15A and 15B made from tungsten, or the like, variations in the state of oxide film on the bonded surface of the tungsten tip 15b in each of the electrodes 15A and 15B, variations in pressure applied between the electrodes 15A and 15B, etc.). Accordingly, variations in welding quality can be eliminated so that welding quality can be made stable. As a result, there is no need of enforcing destructive inspection due to a sampling test for quality certification, so that all welding portions subjected to resistance welding of the strands 31 and 31' in the pair of electric cables 30 and 30' can be inspected non-destructively.

Although the aforementioned embodiment has shown the case where an air cylinder is used as means for driving the upper one in the pair of electrodes, the invention may be applied also to a case where any other actuator such as an oil-pressure cylinder, or the like, is used as the electrode driving means. Although the carrying-out mode has shown the case where mechanical sensors are used as the width measurement means and the height detection means, the invention may be applied also to a case where reflection or transmission optical sensors, or the like are used as the respective means. Furthermore, the welding width of the welding portion, the reference welding sectional area, and the reference welding height vary correspondingly to the subjects of welding. In addition, it is a matter of course that the invention may be applied to ultrasonic welding, etc., other than resistance welding.

As described above, according to the first aspect of the invention, the current-conduction time of the welding current is adjusted correspondingly to variations in the resistance value on the secondary side of the electrodes so that the conduction of the welding current is stopped at a point of time when the gap in the welding portion of the materials to be welded is eliminated. Accordingly, welding quality can be made stable and uniform because it is not affected by the change of the resistance value on the secondary side of the electrodes.

According to the second aspect of the invention, the gap between the wires of the strands is reduced so that the peripheries of the wires of the strands can be closely welded with each other. Accordingly, the adhesive force between the wires of the strands is made stable regardless of the state of the alignment of the strands.

According to the third aspect of the invention, the current-conduction time of the welding current can be changed by the welding timer in accordance with the subjects of welding. Accordingly, the heating value can be changed in accordance with variations in the resistance value on the secondary side of the electrodes. Accordingly, variation in the welding quality can be eliminated to thereby improve the welding quality.

According to the fourth aspect of the invention, the wires of the strands can be closely welded with each other without any gap between the wires of the strands. Accordingly, the welding strength can be made stable regardless of the state of the alignment of the strands. Accordingly, the welding quality can be improved.

What is claimed is:

1. A resistance welding method in which a welding current is passed through a welding portion of a material to be welded in a condition that pressure is applied to said welding portion between a pair of electrodes, so that resistance heating caused by conduction of said welding current is utilized to perform thermo-compression bonding of said welding portion to thereby perform resistance welding of said welding portion under pressure applied between said pair of electrodes, comprising the steps of:

measuring a welding width of said welding portion;

calculating a reference welding height of said welding portion from the measured welding width on the basis of a predetermined reference welding sectional area of said welding portion; and passing the welding current through said welding portion until the height of said welding portion reaches said calculated reference welding height.

2. A resistance welding method according to claim 1, wherein respective strands of a pair of electric cables are used as said materials to be welded so that an exposed strand of one of said electric cables is resistance-welded to an exposed strand of the other one of said electric cables.

3. A resistance welding apparatus comprising:

a pair of electrodes for passing a welding current through a welding portion of a material to be welded and for applying a predetermined amount of pressure to said welding portion;

a welding timer for controlling current-conduction time of said welding current; and a welding transformer for supplying said welding current, whereby resistance heating caused by the conduction of said welding current is utilized to perform resistance welding on said welding portion of said material to be welded in a condition that pressure is applied onto said welding portion by said pair of electrodes, the resistance welding apparatus further comprising:

a width measurement means for measuring a welding width of said welding portion;

an arithmetic operation means for reversely calculating a reference welding height of said welding portion from the welding width measured by said width measurement means on the basis of a predetermined reference welding sectional area of said welding portion;

a height detection means for making detection as to whether a height of said welding portion has reached said reference welding height or not; and an interface for controlling said welding timer to stop the conduction of said welding current when said reference welding height of said welding portion is detected by said height detection means.

4. A resistance welding apparatus according to claim 3, wherein respective strands of a pair of electric cables are used as said materials to be welded so that an exposed strand of one of said electric cables is resistance-welded to an exposed strand of the other one of said electric cables.

* * * * *

UNITED STATES PATENT AND TRADEMARK OFFICE
CERTIFICATE OF CORRECTION

PATENT NO. : 5,973,287
DATED : October 26, 1999
INVENTOR(S) : Yukinori Takano

It is certified that error appears in the above-identified patent and that said Letters Patent is hereby corrected as shown below:

Item [30] FOREIGN APPLICATION PRIORITY DATA:
-- June 12, 1997     [JP]     Japan................9-155255 --

Signed and Sealed this

Ninth Day of October, 2001

Attest:

*Attesting Officer*

NICHOLAS P. GODICI
*Acting Director of the United States Patent and Trademark Office*